Dec. 13, 1960   J. J. CLATFELTER   2,964,145
MEANS FOR SUPPORTING POSTS IN THE GROUND
Filed Nov. 21, 1958   2 Sheets-Sheet 2
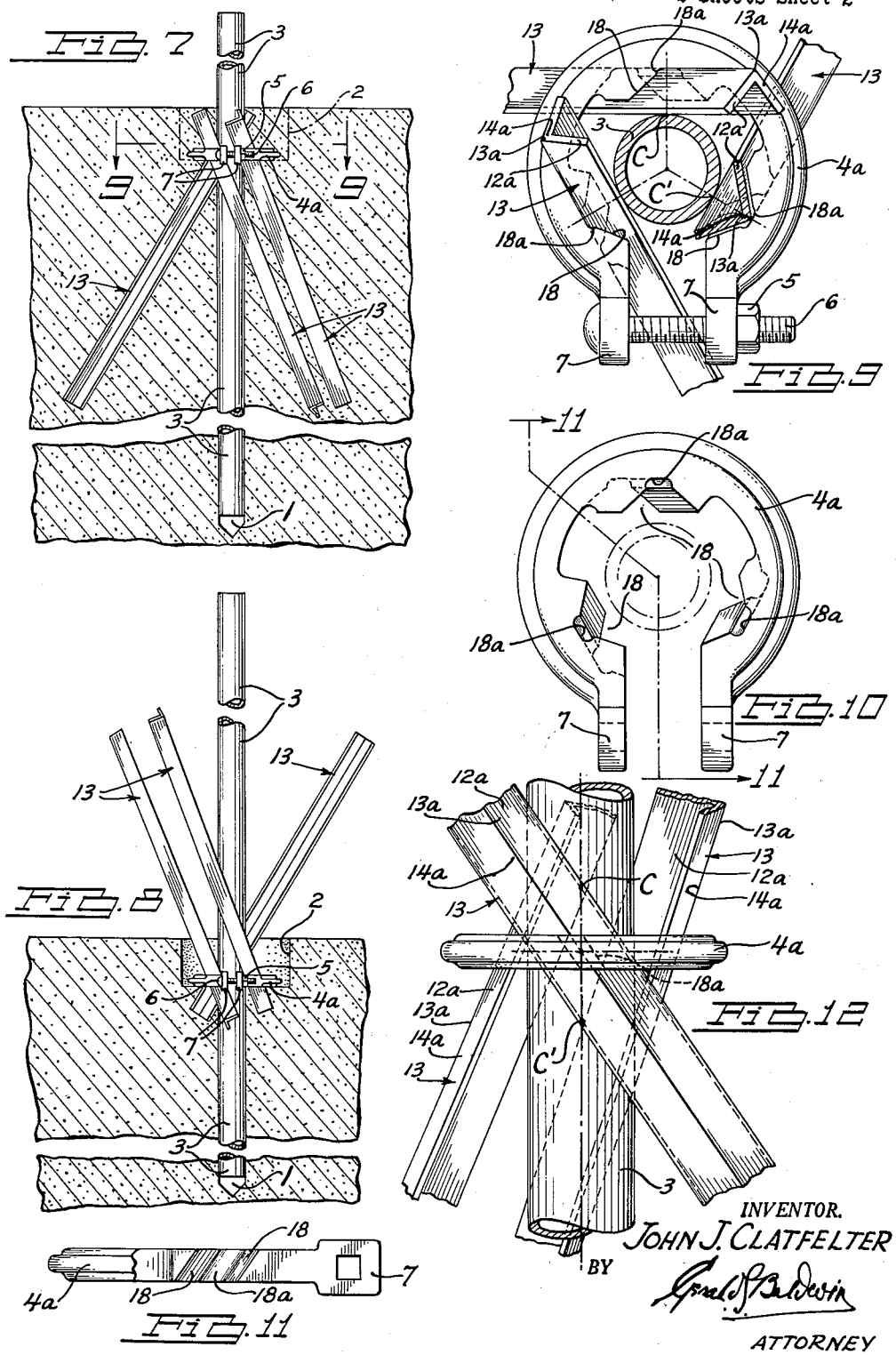
INVENTOR.
JOHN J. CLATFELTER
BY
ATTORNEY

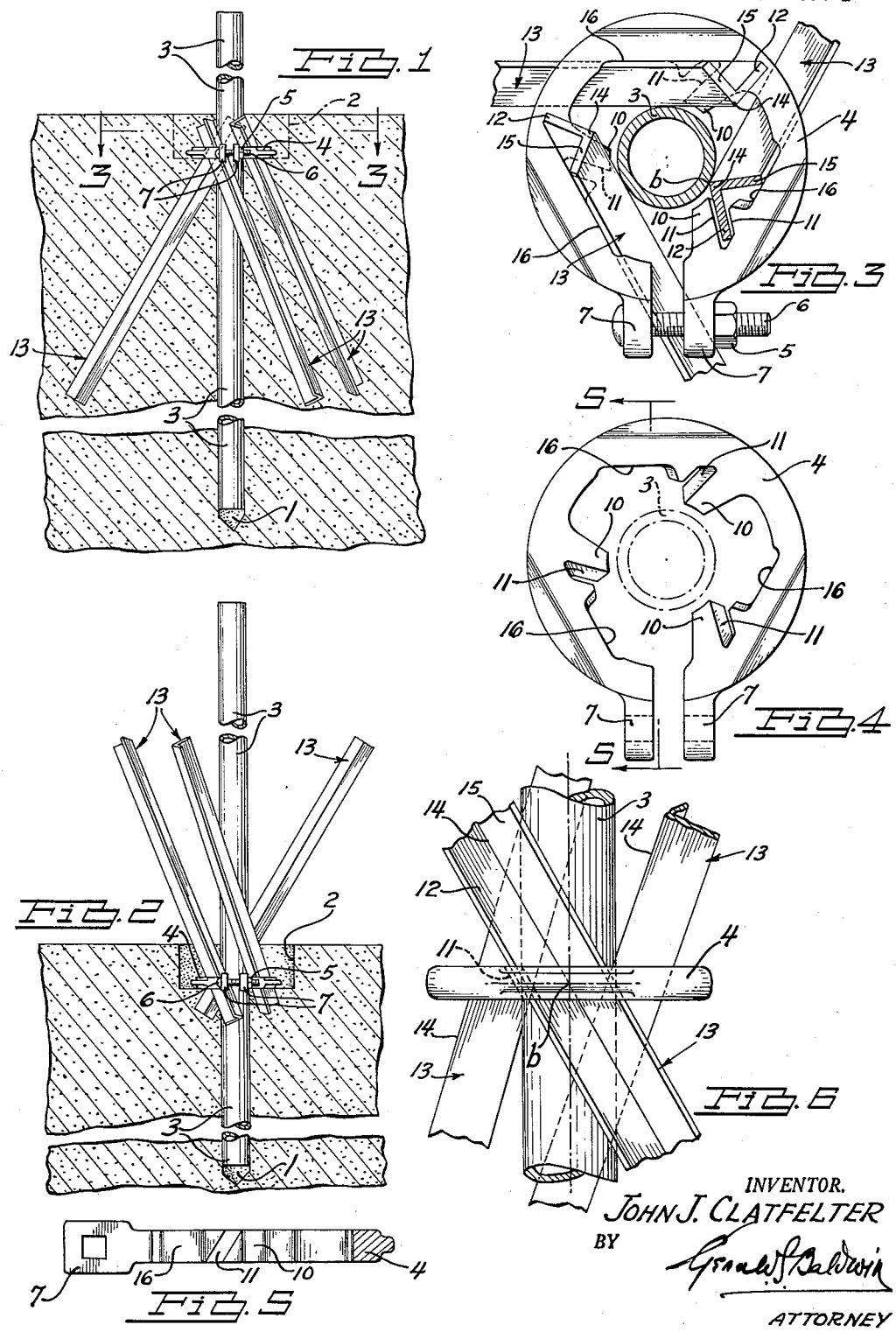

United States Patent Office 2,964,145
Patented Dec. 13, 1960

2,964,145
MEANS FOR SUPPORTING POSTS IN THE GROUND

John J. Clatfelter, Royal Oak, Mich.
(1835 West Drive, Clearwater, Fla.)

Filed Nov. 21, 1958, Ser. No. 775,399

2 Claims. (Cl. 189—30.5)

This invention relates to improvements in means for supporting posts in the ground, and includes means for subsequently releasing them for axial adjustment if necessary. For during the erection of fences, for example, it is often desirable to adjust the height of one or more of the posts after they have been placed in the ground.

It is an object of the invention to provide means for supporting a post with its lower extremity extending downwardly in the ground, including a collar spaced around the post substantially at ground level, and to insert a plurality of downwardly inclined structural members, such as angle members, uniformly spaced from one another around the post and between it and the collar to support the post.

Another object of the invention is to provide such a means for supporting a post, wherein the collar is split, and means are provided for tightening the collar around and against the structural members to force them into binding engagement with the post to hold the latter immovable.

A further object of the invention is to provide such means for tightening the collar against the structural members wherein the said means is releasable so that the collar may be loosened for axial adjustment of the post, and re-tightenable after such adjustment has been made.

Yet another object of the invention is to provide means for supporting posts in the ground which is cheap and simple to make and which can be quickly and easily installed.

Having thus stated some of the objects and advantages of the invention I will now describe two preferred embodiments thereof with the aid of the drawings, in which:

Figure 1 is a side view showing one form of the invention supporting a post in the ground, and Figure 2 is a similar view but with the structural member entered through the spilt collar before being driven in the ground.

Figure 3 is a view partly in section, taken on the line 3—3 of Figure 1.

Figure 4 is a plan view of the collar.

Figure 5 is a section on the line 5—5 of Figure 4, and

Figure 6 is an enlarged side view showing the collar, and portions of the post and of the structural members.

Figures 7 and 8 are side views similar to those in Figures 1 and 2 respectively, but showing a slightly modified form of the invention.

Figure 9 is a view on the line 9—9 of Figure 7 showing the post and one structural member in section.

Figure 10 is a plan view of the collar shown in Figure 9.

Figure 11 is a section on the line 11—11 of Figure 10, and

Figure 12 is an enlarged side view showing the collar and portions of the post and the structural members shown in Figure 7.

Referring to the drawings, 1 designates a hole bored in the ground as by a posthole boring device such as the one shown in my coeval application filed November 21, 1958, Serial No. 775,400; and formed in the ground around the upper extremity of the hole 1 is a shallow counterbore 2. Extending downwardly in the hole 1 is the lower extremity of a post 3 which is axially slidable therein. Resting upon the base of the counterbore, which is substantially at ground level, and spaced coaxially around the post is a somewhat resilient split collar 4, or 4a. Between the latter and the post 3 are a plurality of angle members 13, or 13a, which extend at a downward inclination and have their lower extremities embedded in the ground. When a nut 5 on a bolt 6 which extends through opposed flanges 7 integral with opposite ends of the collar 4, or 4a, is tightened, the angle members 13, or 13a, are drawn into binding engagement with the post and the latter is held immovable. However when the nut 5 is loosened the post is axially slidable through the collar because the latter, due to its resilience, springs outwardly somewhat from the post.

Extending at a downward inclination across and integral with the inner periphery of the collar 4, or 4a, are a plurality of guides (hereinafter described) in which the outer portions of the angle members 13, or 13a, are longitudinally slidable while the inner extremities of the said members bear against and are longitudinally slidable across the post 3. The angle members are all longitudinally slidable at a common inclination to the axis of the collar.

The collar 4, shown in Figures 1 to 6, inclusive, has a plurality of inwardly projecting, integral lugs 10 the inner extremities of which are spaced a somewhat greater distance from the axis of the post than the periphery of the latter. In this instance three lugs are provided which are uniformly spaced from one another, and extending radially outward in each lug from its extremity adjacent the post and substantially tangentially thereto is a recess 11 of uniform width throughout its length. These recesses are uniformly and circularly spaced from one another and are downwardly inclined through the collar. The inclination of the recesses in the present instance is substantially 35 degrees to the axis of the collar, though it may be somewhat increased if desired.

Longitudinally slidable through each recess 11 is one flange 12 of an angle member 13. The heel 14 of each angle member extends inwardly towards the post 3 and bears against a small portion of the periphery of the latter indicated at $b$ which is on the horizontal center line of the collar 4. The outer extremity of the other flange 15 of each angle member extends at a downward inclination across a bearing face 16 formed in the inner periphery of the collar and across which the said flange 15 is slidable. Thus the recesses 11 and the bearing faces 16 form guides along which the angle members are slidable and which retain the said members uniformly spaced from one another and at a common inclination to the axis of the collar 4.

In the modification shown in Figures 7 to 12, inclusive, the collar 4a has a plurality of uniformly spaced, vertically inclined V-shaped slots 18 formed across its inner periphery, the opposite sides of each of which are disposed at approximately 90 degrees to one another. These slots are usually inclined at substantially 35 degrees to the axis of the collar and formed along the base of each slot throughout its length is a recess 18a which constitutes a guide to receive and support the heel 14a of one of the angle members 13a. The recesses are shallow and the spacing of the opposite side of the slots from one another is somewhat greater than the distance between the outer faces of the opposite flanges 12a and 14a of the angle members. Therefore quite limited lateral movement of the angle members is permitted in their slots. The angle members 13a are so positioned relative to the post 3 that as each member is forced through its V-slot into the ground the outer extremity of its flange 12a moves tangentially across and in contact with the post at c above the collar, and, as downward movement continues, the other flange 14a passes tangentially across and in contact with the periphery of the post at c' the same distance beneath the said collar. As long as the collar 4a is tightly held against the angle members 13a to force the latter into engagement with the post axial movement of the latter is prevented, but when the nut 5 is loosened the resilience of the collar allows the members to become disengaged from the post to permit axial movement of the latter. If excessive is exerted against either or both flanges of one or more of the angle members these flanges can only become slightly distorted by tightening the collar because the sides of the V-slots are so close to the flanges.

From the foregoing it is apparent that the angle members may be arranged with their heels either inwardly directed towards the axis of the post, or outwardly to engage guides formed across the inner periphery of the collar. Furthermore while in both instances herein described and shown angle members are employed, it is understood that structural members of other sectional forms may be employed if preferred.

While in the foregoing the invention, in some of its embodiments, has been described and shown, it is understood that further alternations and modifications may be made thereto provided the said alterations and modifications fall within the scope of the appended claims.

What I claim is:

1. In a device for supporting a post, the improvement which comprises a one piece split collar having an opening therethrough and having opposed ends at the split in the collar spaced apart a predetermined distance to enable constriction of the opening through said collar when said ends are forced toward each other, tightening means operatively connected to said collar for causing relative movement of said ends toward each other, said collar being resilient to produce an opening bias whereby said collar automatically expands upon release of said tightening means, said collar having an internal surface defining said opening, the innermost periphery of which having a diameter sufficiently greater than the predetermined outside diameter of the post preventing contact therebetween when in final assembled condition, at least three V-shaped slots formed around said internal surface at an inclination to the longitudinal axis of the collar, an angle iron seated in each of said V-shaped slots, the inner faces of the slots being spaced from the outer faces of the angles iron thus providing loose guided movement of the angle iron upon being driven into the ground, each angle iron having flanges with edges loosely and guidingly contacting a post positioned within said opening, each of said edges of said angle irons being forced into frictional engaging contact with said post and said outer faces of said angle irons being forced into engagement with said slot faces upon constriction of said collar by said tightening means.

2. In a device as defined in claim 1 and wherein the two edges of each angle iron provide frictional contact with the post at spaced locations on opposite sides of and spaced from said collar.

References Cited in the file of this patent

UNITED STATES PATENTS

| | | |
|---|---|---|
| 919,807 | Bailey | Apr. 27, 1909 |
| 1,107,016 | Bailey | Aug. 11, 1914 |
| 1,504,899 | Quinn et al. | Aug. 12, 1924 |
| 2,826,281 | Johnson | Mar. 11, 1958 |